US 7,907,616 B1

(12) United States Patent
Breau et al.

(10) Patent No.: US 7,907,616 B1
(45) Date of Patent: Mar. 15, 2011

(54) DYNAMICALLY MODIFIABLE QUALITY OF SERVICE INDICATOR

(75) Inventors: Jeremy R. Breau, Kansas City, MO (US); Frederick C. Rogers, Olathe, KS (US); Ray R. Doerr, Gardner, KS (US); Gary Rieschick, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 815 days.

(21) Appl. No.: 11/830,470

(22) Filed: Jul. 30, 2007

(51) Int. Cl.
*H04L 12/56* (2006.01)

(52) U.S. Cl. .................. 370/395.21; 370/236

(58) Field of Classification Search .............. None
See application file for complete search history.

(56) References Cited

U.S. PATENT DOCUMENTS

| 6,822,940 | B1 * | 11/2004 | Zavalkovsky et al. | 370/237 |
| 7,581,098 | B2 * | 8/2009 | Ragland et al. | 726/2 |
| 2010/0158006 | A1 * | 6/2010 | Dawson | 370/392 |

FOREIGN PATENT DOCUMENTS

JP 2006245691 A * 9/2006

* cited by examiner

*Primary Examiner* — Jayanti K Patel
*Assistant Examiner* — Matthew Campbell (57) ABSTRACT

Computer-readable media for dynamic quality of service assignment are described. In embodiments, a data packet is received that is part of a communications stream and a dynamically modifiable quality of service indicator (DMQOSI) is embedded into the data packet wherein, in various embodiments, the DMQOSI indicates a prescribed quality of service that is associated with the data packet and is modifiable prior to completing a communication of the communications stream. In various embodiments, the data packet is communicated from a source to a destination that at least periodically references the DMQOSI to ensure that the data packet is being communicated consistent with the prescribed quality of service associated with the data packet.

15 Claims, 7 Drawing Sheets

DYNAMICALLY MODIFIABLE QUALITY OF SERVICE INDICATOR

CROSS-REFERENCE TO RELATED APPLICATIONS

Not applicable.

SUMMARY

The present invention is defined by the claims below. Embodiments of the present invention address at least the issues described herein by providing, among other things, technologies for dynamically associating a network communications stream with a given quality of service (QOS). Embodiments of the present invention have several practical applications in the technical arts, including preventing abuse and illegitimate use of unauthorized levels of QOS from a service provider and ensuring the appropriate QOS is associated with one or more data packets in a communications stream.

In a first illustrative aspect, a data packet is received that is part of a communications stream and that includes a dynamically modifiable QOS indicator (DMQOSI), which indicates a prescribed QOS that is associated with the data packet and that is modifiable prior to completing communication of the communications stream. The data packet is communicated from a source to a destination that at least periodically references the DMQOSI in one embodiment to ensure that the data packet is being communicated with the prescribed QOS associated with the data packet.

In a second illustrative aspect, a data packet is received that is a part of a communications stream. A DMQOSI is embedded into the data packet to indicate a prescribed QOS that is associated with the data packet. The QOS is modifiable prior to beginning communication of the communications stream. The data packet is communicated from a source to a destination that at least periodically references the DMQOSI to ensure that the data packet is being communicated with the prescribed QOS associated with the data packet.

In a third illustrative aspect, a request for a DMQOSI is received that indicates a QOS to be associated with a data packet that is one of many packets that make up a communications stream. A value to be given to the DMQOSI is determined. The value is associated with a given QOS, but is different than at least one other value that had previously been utilized to indicate the same QOS. The value is assigned to the DMQOSI and the DMQOSI is communicated to a communications source such that the DMQOSI is usable by the communications source to encode the DMQOSI into the data packet which can subsequently be inspected to ensure that the data packet is being accorded the QOS.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide computer-readable media for dynamic QOS assignment. The dynamic QOS assignment allows a mobile node (mobile phone, PDA, VoIP handset, cable modem, DSL modem, or any other device that can send data packets and is adapted to be able to manipulate packet-header information) to set the QOS level for a data packet (or set of packets) using a dynamically modifiable indicator, overcoming the deficiencies associated with a static QOS indicator. For instance, a static QOS scheme is vulnerable to abuse by users affirmatively setting data packet QOS to an inappropriate level. Using the dynamic QOS indicator included in the present invention, a service provider is able to prevent abuse by users manipulating the content of data packets to provide an inappropriate QOS. That is, in the past, a user may have been able to determine a code that a service provider uses to indicate some QOS level. If that code is stagnant, then the user can manipulate packets to be sent so that the packets include that stagnant code. But embodiments of our invention allow that code to be dynamically modifiable, making hacking significantly more difficult.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| DMQOSI | Dynamically Modifiable Quality of Service Indicator |
| DVD | Digital Versatile Discs |
| EEPROM | Electrically Eraseable Programmable Read Only Memory |
| IP | Internet Protocol |
| QOS | Quality of Service |
| RAM | Random Access Memory |
| ROM | Read Only Memory |
| TOS | Type of Service |
| VOIP | Voice Over Internet Protocol |

Further, various technical terms are used throughout this description. An illustrative resource that fleshes out various aspects of these terms can be found in *Newton's Telecom Dictionary* by H. Newton, 22nd Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

One or more dynamically modifiable quality of service indicators (DMQOSI) are used to indicate a QOS associated with (or in some cases to be associated with) a communications stream, or packets that make up the same. In various embodiments, a data packet that is part of a communications stream is received, and a DMQOSI is embedded into the data packet indicating a prescribed QOS that is associated with the data packet. The DMQOSI is modifiable prior to completing a communication of the communications stream. In other embodiments, the DMQOSI is modifiable prior to beginning the communication of the communications stream. The data packet can be communicated from a source to a destination, which at least periodically references the DMQOSI. "Periodically" is not meant to imply only regular intervals (though it could be). Instead, it is contemplated and within the scope of the present invention that the destination may reference the DMQOSI at irregular intervals. Data packets are communicated consistent with the prescribed QOS associated with them.

While various embodiments discussed herein refer to a communications stream of IP data packets, embodiments are not limited to any particular data-packet configuration. For instance, without limitation, any type of data packet with QOS capacity may be used in conjunction with various embodiments of the present invention.

Figure 1:
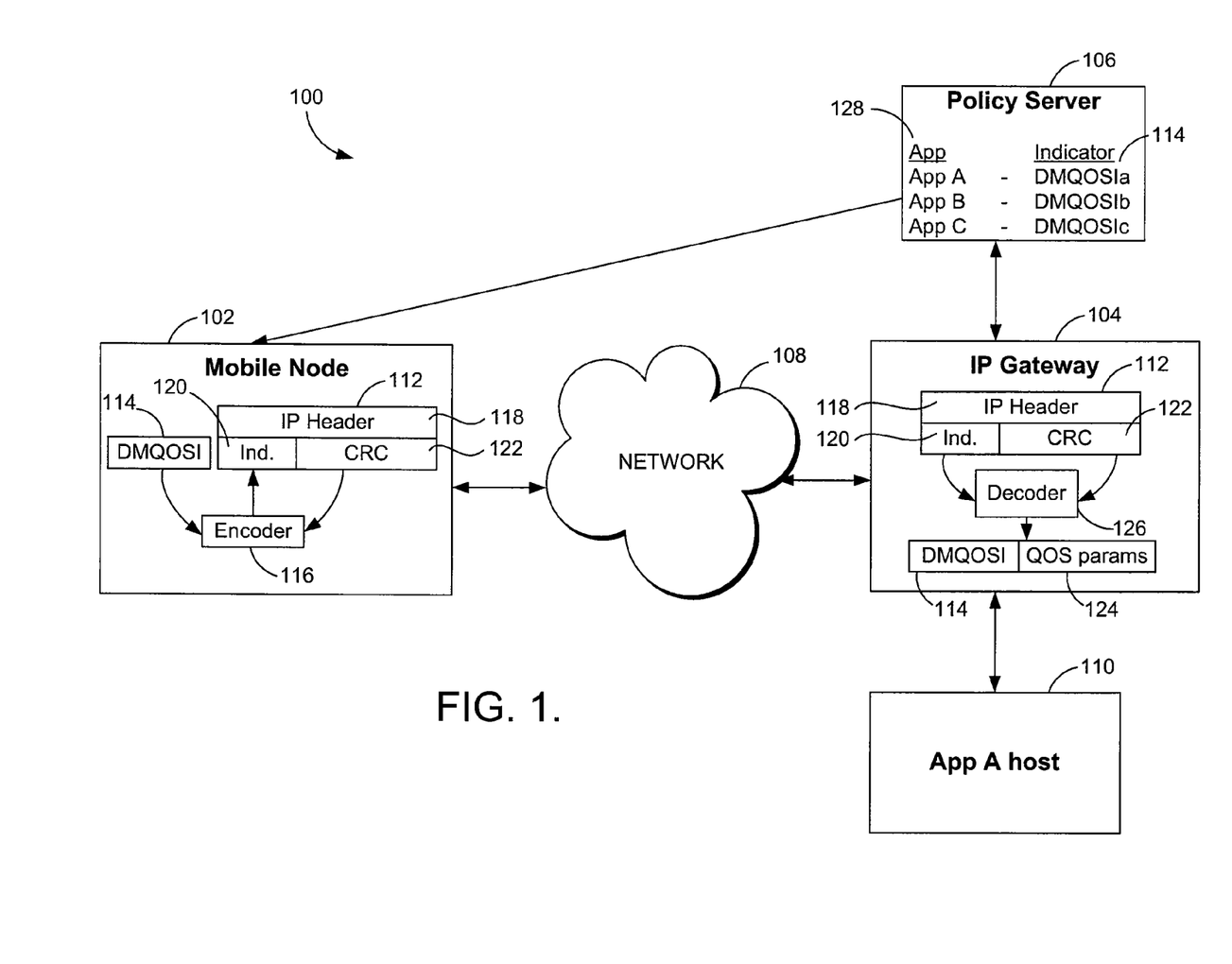
FIG. 1 is a block diagram of an exemplary operating environment illustrating a dynamic quality of service assignment implementation, in accordance with an embodiment of the present invention.

Turning now to FIG. 1, a block diagram of an exemplary operating environment illustrating a dynamic QOS implementation in accordance with an embodiment of the present invention is illustrated and designated generally by reference numeral 100. Exemplary operating environment 100 is shown to illustratively include mobile node 102, an IP gateway 104, a policy server 106, and a network 108. IP gateway 104 is connected to, among other things, application host 110.

Mobile node 102 facilitates the communication of a data packet 112, and includes an encoder 116 to encode DMQOSI 114 into data packet 112. Data packet 112 may include a header 118. Header 118 may include an indicator field 120 and a checksum field 122. Mobile node 102 receives data packet 112 as part of a communications stream comprising one or more data packets. Mobile node 102 associates data packet 112 with a QOS by embedding indicator 114 into data packet 112. Mobile node 102 may receive indicator 114 from policy server 106, which associates indicator 114 with a QOS.

Policy server 106 includes policies that are associated with various applications 128. For example different QOS levels may apply to different communications streams based upon the application being utilized. For instance, VoIP calls may receive a high QOS, while Internet browsing may receive a lower QOS. Embodiments of the present invention, however, are not limited to configurations involving policy server 106. For instance, mobile node 102 may determine indicator 114, and associate indicator 114 with a QOS prior to embedding indicator 114 into data packet 112.

As previously stated, indicator 114 is dynamically modifiable such that indicator 114 may, in various embodiments, be modified during sending or receiving a communications stream. For instance, indicator 114 may be modified upon the expiration of a time-based event (such as the passing of a duration of time). Thus, in these embodiments, upon expiration of the time-based event, the bits making up indicator 114 are modified such that different bits are now associated with various QOS levels.

In various other embodiments, although indicator 114 remains dynamically modifiable, indicator 114 may be modified upon initiation of a communications stream such that indicator 114 may remain constant during the communications stream. Thus, upon the completion of communicating a communications stream, indicator 114 may be modified such that different bits are now associated with the same QOS level (as well as others bits being associated with various other QOS levels).

Indicator 114 may be embedded directly into data packet 112 without encrypting or hashing. In other embodiments, indicator 114 may be encoded prior to being embedded into data packet 112. For instance, indicator 114 may be encoded using encoder 116. Indicator 114 may be encoded by hashing indicator 114 with a portion of data packet 112 such as checksum value 122. Others values could be used as well. As will be understood and appreciated by those of ordinary skill in the art, embodiments of the present invention are not limited to particular encoding schemes, and various embodiments contemplate and include encoder 116 encoding indicator 114 utilizing various encoding mechanisms.

IP gateway 104 receives data packet 112 from mobile node 102 through network 108 in one embodiment. Network 108 can be a wireless network, wired, or combination thereof. As previously stated, data packet 112 may, in various embodiments, include a header 118. In various embodiments, without limitation, header 118 includes an indicator field 120 and a checksum field 122. Where appropriate, IP gateway 104 is configured to retrieve data from indicator field 120 and from data packet 112. In one embodiment, IP gateway 104 compares the contents of indicator field 120 with indicator 114.

Where the contents of indicator field 120 match indicator 114, IP gateway 104 associates data packet 112 with a set of QOS parameters 124, which ensure the data packet receives the appropriate QOS. IP gateway 104 may receive indicator 114 as well as QOS parameters 124 from policy server 106. In other embodiments, mobile node 102 sets indicator 114 and QOS parameters 124, in which case IP gateway 104 may receive indicator 114 and QOS parameters 124 from mobile node 102.

As previously mentioned, indicator 114 is dynamically modifiable while sending or receiving a communications stream. For example the first packet of a communications stream may be associated with a QOS indicator, such as indicator 114, indicating a QOS level for that packet, and in some embodiments, the entire communications stream. IP gateway 104 may retrieve the contents of indicator field 120 from the first data packet in a communications stream and apply the appropriate QOS level. In some embodiments, IP gateway 104 identifies the first data packet in a communications stream to distinguish between communications streams using socket information such as source and/or destination addresses associated with the data packet.

Indicator 114 may be associated with a time-based event. By way of example, without limitation, indicator 114 may be dynamically modifiable upon expiration of the time-based event even during the course of communicating a communications stream. Indicator 114 may be embedded in the first data packet of a communications stream, such as data packet 112, setting the QOS for the communications stream. After a certain amount of time, the next data packet in the communications stream is associated with a new indicator 114, the indicator being different than the previous indicator 114 even while the associated QOS remains the same. Thus, in this example, upon expiration of the time-based event, IP gateway 104 will retrieve the contents of indicator field 120 from the next data packet in the communications stream and compare the contents of indicator field 120 with indicator 114, applying a set of QOS parameters 124, where appropriate.

Embodiments can also include a flow-based expiry (in addition to or in place of a time-based expiry). Where a flow-based expiry is utilized, mobile node 102 may set, and IP gateway 104 may retrieve the contents of indicator field 120 of the first data packet in a communications stream. If IP gateway 104 determines that the retrieved contents of indicator field 120 matches indicator 114, the IP gateway 104 may associate the entire communications stream with a set of QOS parameters 124.

By way of example, where there are two consecutive communications streams seeking identical qualities of service, indicator 114 may not be the same for both. For instance, mobile node 102 or policy server 106 may set indicator 114 for the first communications stream to "0011" indicating a level 5 QOS. For the next communications stream, although the desired QOS is still level 5, mobile node 102 or policy server 106 may set indicator 114 to 1100.

As previously stated, indicator 114 may be embedded into indicator field 120 of data packet 112 without varying its native value. In this embodiment, IP gateway 104 retrieves the contents of indicator field 120 from data packet 112 without utilizing decoder 126. In other embodiments, indicator 114 may be encoded utilizing encoder 116 prior to embedding in indicator field 120 of data packet 112. Where indicator 114 has been encoded, IP gateway 104 may be configured to decode the contents of indicator field 120, utilizing decoder 126 to ascertain indicator 114. For instance, where indicator 114 is encoded by hashing indicator 114 with a portion of data packet 112 such as checksum 122 or some other value, decoder 126 may perform a reverse-hash on the contents of indicator field 120 to ascertain indicator 114.

As discussed herein, IP gateway 104 is described as performing various functions, such as decoding indicator field 120 and ascertaining indicator 114. The functionality discussed in relation to IP gateway 104 may be performed by IP gateway 104 or may be performed by an application that runs on IP gateway 104. Further, where the application running on IP gateway 104 performs the functionality discussed herein, the application may reside on IP gateway 104 or may reside in a remote location.

Figure 2:
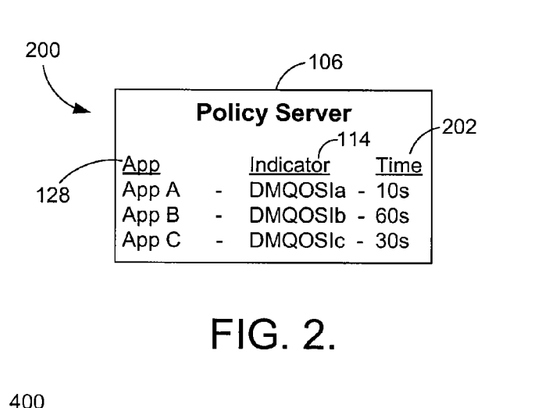
FIG. 2 is a block diagram illustrating an exemplary policy server implementation utilizing a time-based event, in accordance with an embodiment of the present invention.

Turning now to FIG. 2, a block diagram illustrating an exemplary policy server implementation utilizing a time-based event, in accordance with an embodiment of the present invention, is illustrated and designated generally by reference numeral 200. As previously stated with reference to FIG. 1, indicator 114 may be set utilizing a policy server, such as policy server 106. Policy server 106 (or any device that performs the functions described herein) may periodically determine indicator 114, and associate indicator 114 with a QOS level including QOS parameters 124 (FIG. 1). As illustrated in FIG. 2, policy server 106 may determine various QOS indicators for various applications.

Thus, indicator 114 for one application 128 may be different than indicator 114 for another application 128. Time-based event 202 may also vary. Upon expiration of time-based event 202, policy server 106 may determine a new indicator 114 for each application 128, or some of them. Policy server 106 will communicate indicator 114 to mobile node 102 and IP gateway 104 after determining a new indicator 114 upon expiration of the time-based event.

Figure 3:
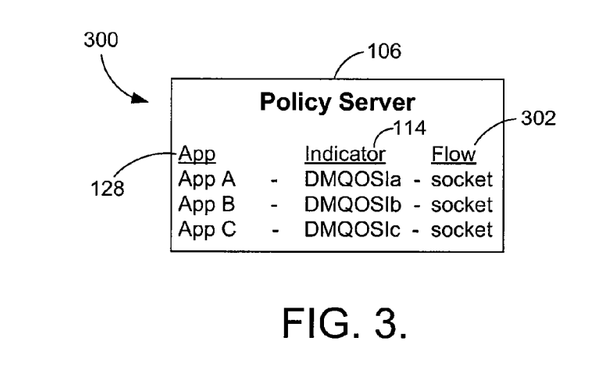
FIG. 3 is a block diagram illustrating an exemplary policy server implementation utilizing a flow-based expiry, in accordance with an embodiment of the present invention.

Turning now to FIG. 3, a block diagram illustrating an exemplary policy server implementation utilizing a flow-based expiry, in accordance with an embodiment of the present invention, is illustrated and designated generally by reference numeral 300. As mentioned, policy server 106 may modify indicator 114 based on a flow-based expiry. Various components discussed herein may be configured to determine the start and end of a communication utilizing, among other things, sockets including source and/or destination information. Socket technology is well-known in the art and will not be further discussed herein.

Policy server 106 will set indicator 114 at the beginning of a communications stream, indicating a QOS to be associated with the stream. This information may be communicated to mobile node 102 and IP gateway 104 of FIG. 1. Upon expiration of a communications stream, policy server 106 determines a new indicator 114 to be associated with the next communications stream. By way of example, policy server 106 sets indicator 114 to "0000" for a first communications stream seeking a QOS "level 5." Once the communications stream has ended, policy server 106 sets indicator 114 to a different value, such as "1111" for a next communications stream seeking a QOS "level 5." Thus, indicator 114 is dynamically modifiable prior to beginning communication of a communications stream.

Figure 4:
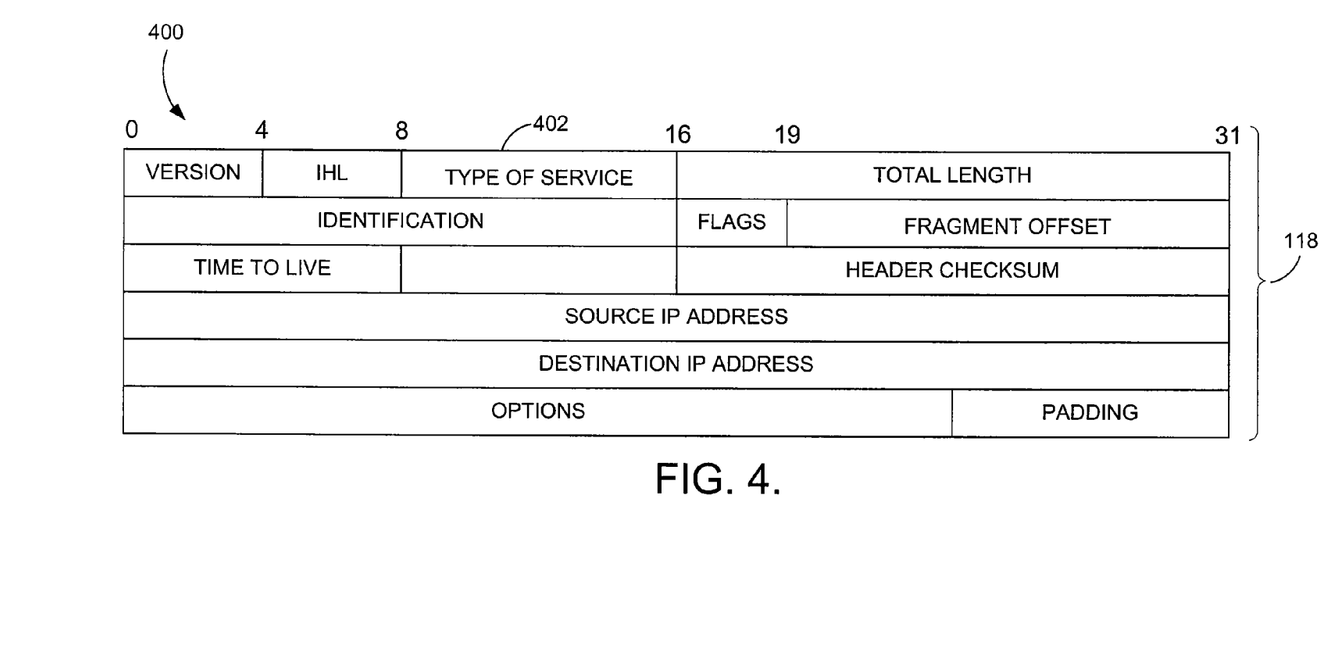
FIG. 4 is a block diagram illustrating an exemplary data packet header, in accordance with an embodiment of the present invention.

Turning now to FIG. 4, a block diagram illustrating an exemplary data packet header, in accordance with an embodiment of the present invention, is illustrated and designated generally by reference numeral 400. Although the packet header 118 is provided for illustrative purposes, embodiments of the present invention are not limited to the particular header configuration shown in FIG. 4. Instead, it is contemplated that various types of data packets, including various header configurations, may be utilized. In the exemplary illustration of FIG. 4, header 118 includes a type of service (TOS) field 402. As discussed, indicator 114 of FIG. 1 is embedded into the data packet, such as into TOS field 402, by mobile node 102. In various embodiments, indicator 114 is encoded prior to being embedded into TOS field 402 and in various other embodiments, indicator 114 is embedded directly into TOS field 402 without encoding. Although the discussion herein focuses on embedding indicator 114 into TOS field 402, indicator 114 may also be embedded into other portions of header 118 or into the body of data packet 112.

Figure 5:
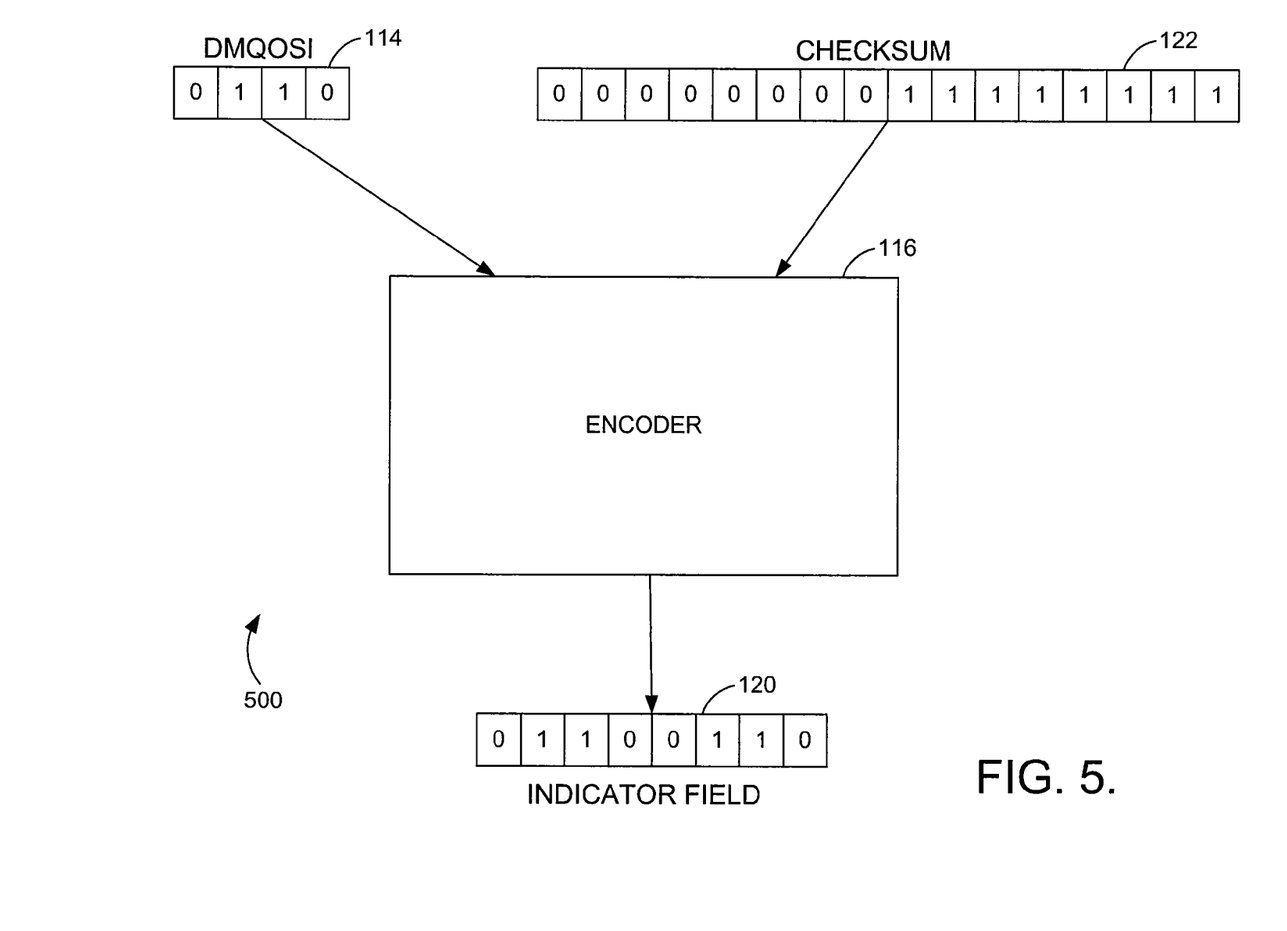
FIG. 5 is a block diagram illustrating an exemplary encoding implementation, in accordance with an embodiment of the present invention.

Turning now to FIG. 5, a block diagram illustrating an exemplary encoding implementation, in accordance with an embodiment of the present invention, is illustrated and designated generally by reference numeral 500. As illustrated in FIG. 5, indicator 114 is encoded prior to embedding into data packet 112. Although encoding may occur in various ways, here indicator 114 is encoded by hashing indicator 114 with checksum 122. The hashing function produces encoded bits that are embedded into indicator field 120.

Figure 6:
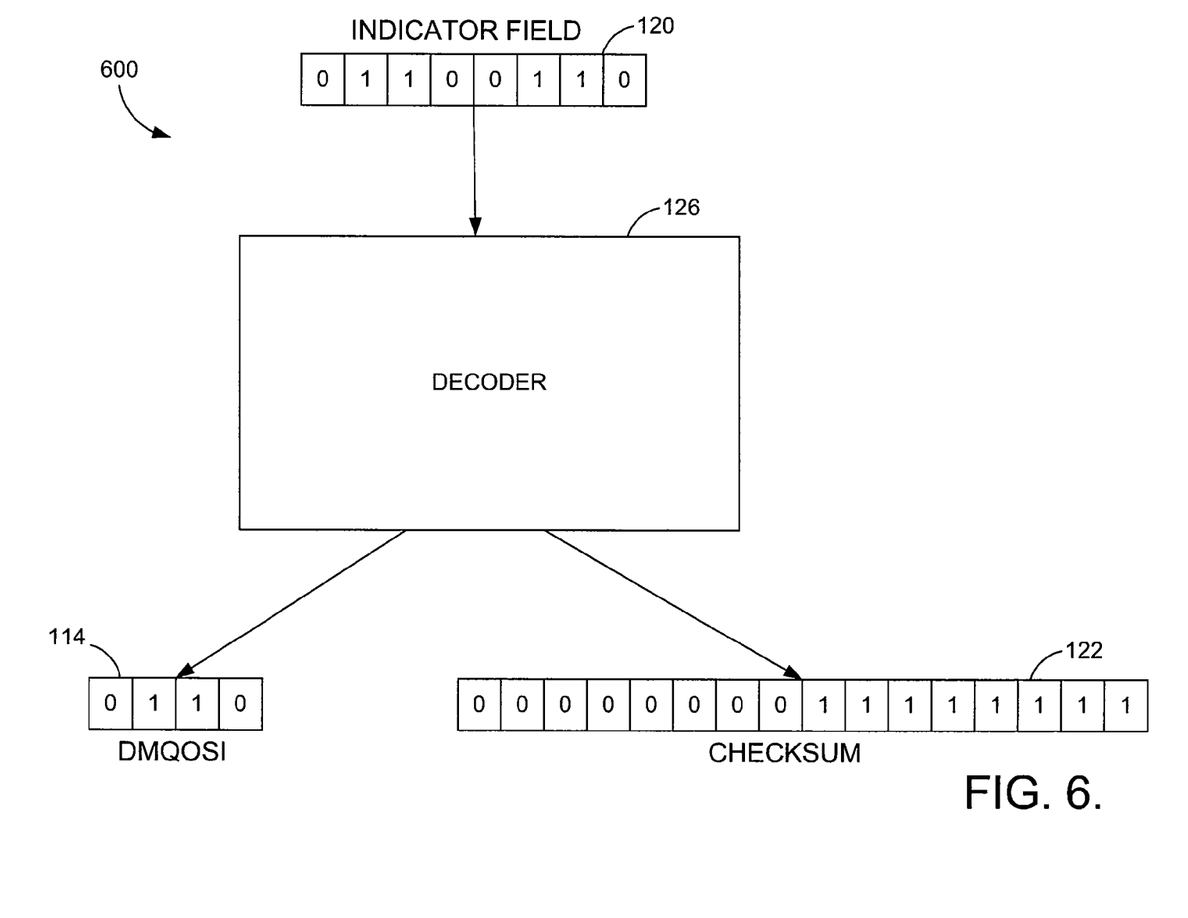
FIG. 6 is a block diagram illustrating an exemplary decoding implementation, in accordance with an embodiment of the present invention.

Turning now to FIG. 6, a block diagram illustrating an exemplary decoding implementation, in accordance with an embodiment of the present invention, is illustrated and designated generally by reference numeral 600. As illustrated in FIG. 6, decoder 126 retrieves the contents of indicator field 120 from data packet 112. Decoder 126 then decodes the contents of indicator field 120 to ascertain indicator 114 and checksum 122. For example, as illustrated here, decoder 126 reverse-hashes indicator field 120. Stated differently, decoder 126 in FIG. 6 decodes indicator field 120, created as illustrated in FIG. 5, and ascertains indicator 114 and checksum 122 originally used in FIG. 5 to encode indicator field 120.

Figure 7:
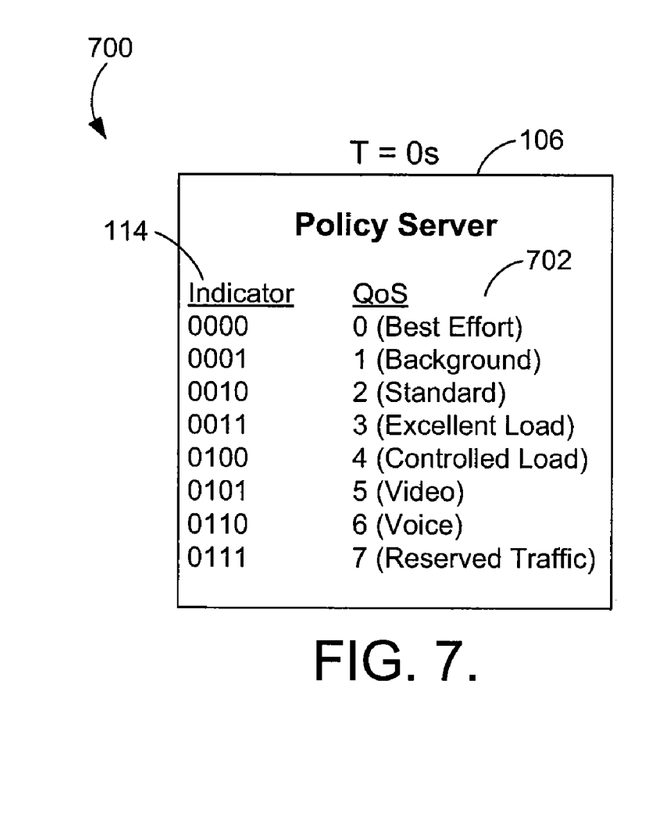
FIG. 7 is a block diagram illustrating exemplary indicators associated with exemplary quality of service levels utilizing a time-based event, in accordance with an embodiment of the present invention.

Turning now to FIG. 7, a block diagram illustrating exemplary indicators associated with exemplary QOS levels utilizing a time-based event, in accordance with an embodiment of the present invention, is illustrated and designated generally by reference numeral 700. In the example illustrated in FIG. 7, there are 8 QOS levels ranging from 0 (best effort) to 7 (reserved traffic). Indicator 114 has a different value for each available QOS at a time T=0s. A comparison of the indicator values 114 in FIG. 7 with the indicator values 114 of FIG. 8 illustrates the dynamically modifiable nature of the indicators at points in time 30 seconds apart where there has been a time-based event during the 30 seconds.

Figure 8:
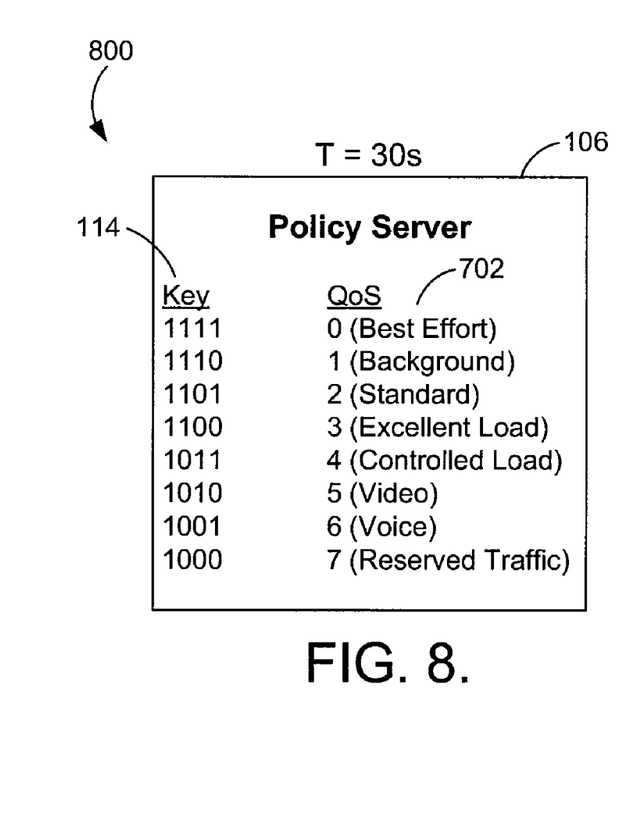
FIG. 8 is a block diagram illustrating exemplary indicators associated with exemplary quality of service levels utilizing a time-based event, the indicators associated with quality of service levels at a point in time 30 seconds after the exemplary indicators of FIG. 7, in accordance with an embodiment of the present invention.

Turning now to FIG. 8, a block diagram illustrating exemplary indicators associated with exemplary QOS levels utilizing a time-based event, the indicators associated with QOS levels at a point in time 30 seconds after the exemplary indicators of FIG. 7, in accordance with an embodiment of the present invention, is illustrated and designated generally as 800. As previously stated, the dynamically modifiable nature of indicator 114 is illustrated in FIGS. 7 and 8. More specifically, in FIG. 7, indicator 114 is set to "0000" for QOS level 0 (best effort). After the expiration of a time-based event (here 30 seconds), in FIG. 8, indicator 114 is set to "1111" for QOS level 0 (best effort). In other examples, the expiry may be flow-based instead of the time-based implementation illustrated here. As shown, indicator 114 is dynamically modifiable such that the value associated with a given QOS is different than at least one other value that had previously been utilized to indicate the same QOS.

Figure 9:
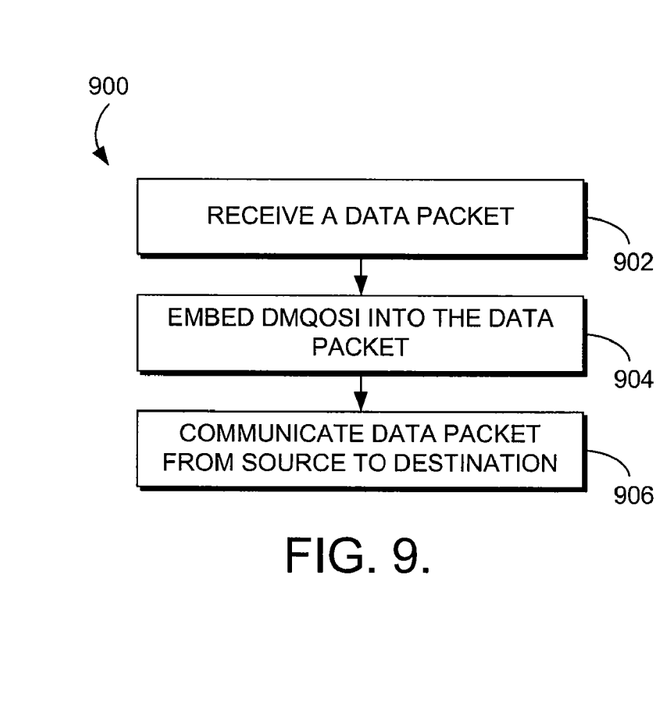
FIG. 9 is a flow diagram illustrating an exemplary method for dynamic quality of service assignment, in accordance with an embodiment of the present invention.

Turning now to FIG. 9, a flow diagram of an exemplary method for dynamic QOS assignment, in accordance with an embodiment of the present invention, is illustrated and designated generally by reference numeral 900. Initially, as indicated at block 902, a data packet is received, e.g., by mobile node 102 of FIG. 1. As previously discussed, the data packet includes various types of data packets but in one example may be an IP data packet.

Next, as indicated at block 904, a DMQOSI, or indicator, is embedded into the data packet, e.g., indicator 114 of FIG. 1. In one example, the data packet is embedded into an indicator field, such as indicator field 120 of FIG. 1, of the data packet. As previously discussed, the indicator is dynamically modifiable upon expiration of a time-based event and/or a flow-based expiry. For example, utilizing a time-based event, when a mobile node initiates a communications stream, an indicator is placed in the first data packet indicating a QOS for the communications stream. Assuming the communications stream lasts for 2 minutes, at the end of the time-based event, for example, 30 seconds into the communication, the indicator will be modified. Stated differently, the bit values of the indicator will change, although the desired QOS remains the same. The modification of the indicator will occur again after another time-based event, or 30 seconds, so long as the communication remains ongoing. Upon initiation of a new communications stream, the modifications may occur again, regardless of the status of the time-based event. Or, the modifications might be delayed until the end of the time-based event, even though a new communications stream is being communicated.

Next, as indicated at block 906, the data packet is communicated from a source to a destination, such as IP gateway 104 of FIG. 1. For example, the destination retrieves the indicator field, such as indicator field 120 of FIG. 1, from the communicated data packet and determines whether the indicator field corresponds with an indicator such as indicator 114 of FIG. 1. Where the field does correspond with an indicator, the destination applies a set of QOS parameters to the data packet that correspond with the indicator. The destination periodically retrieves the indicator filed to ensure one or more data packets in a communications stream are being routed with an appropriate QOS level.

Figure 10:
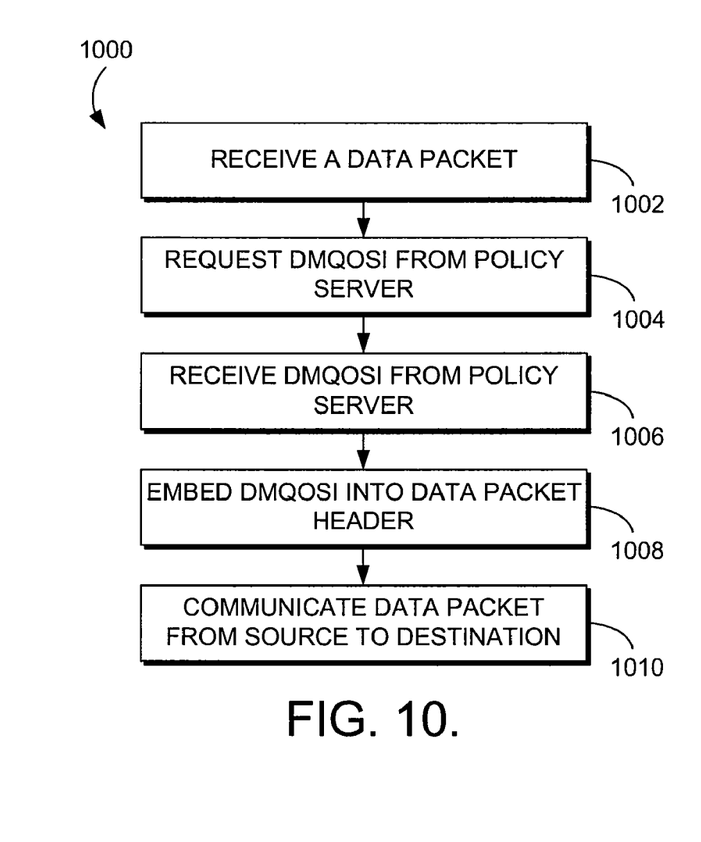
FIG. 10 is a flow diagram illustrating an exemplary method for dynamic quality of service assignment, the method having more detail than the method of FIG. 9, in accordance with an embodiment of the present invention.

Turning now to FIG. 10, a flow diagram of an exemplary method for dynamic QOS assignment, the method having more detail than the method of FIG. 9, in accordance with an embodiment of the present invention, is illustrated and designated generally by reference numeral 1000. Initially, as indicated at block 1002, a data packet is received, e.g., by mobile node 102 of FIG. 1, as previously discussed with reference to FIG. 9. Next, at block 1004, an indicator is requested from a policy server, e.g., policy server 106 of FIG. 1. For example, a policy server determines bit values for an indicator and then the policy server communicates those values periodically to both a source and a destination of a communications stream. Thus, both the source and the destination have access to current indicator values. Also, the destination has access to QOS levels associated with indicator values, allowing the destination to apply a set of QOS parameters to a communications stream where a field in the data packet corresponds with a current indicator received from the policy server.

Next, as indicated at block 1006, an indicator is received from a policy server, e.g., policy server 106 of FIG. 1. As previously stated, the policy server communicates the indicator to both a source and a destination. Next, as indicated at block 1008, the indicator is embedded into a data packet header, e.g., header 112 of FIG. 1. As previously discussed, a source, such as mobile node 102 of FIG. 1, will embed the indicator into the data packet header using an indicator field, such as indicator field 120 of FIG. 1.

Next, as indicated at block 1010, the data packet is communicated from a source, such as mobile node 102 of FIG. 1, to a destination, such as IP gateway 104 of FIG. 1, as previously discussed with reference to FIG. 9. As previously stated, the destination periodically references the indicator to ensure that the communications stream is being communicated consistent with a prescribed QOS associated with the data packet.

Figure 11:
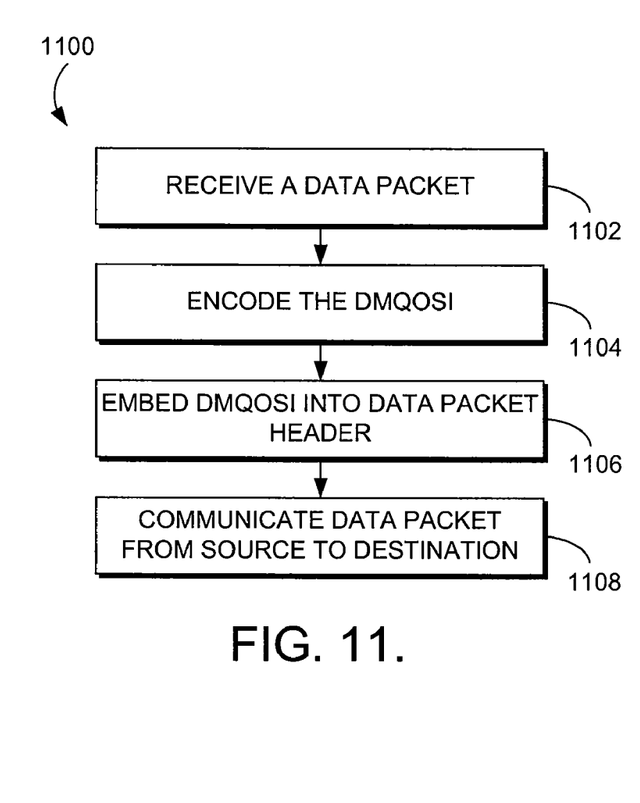
FIG. 11 is a flow diagram illustrating an exemplary method for dynamic quality of service assignment utilizing encoding, in accordance with an embodiment of the present invention.

Turning now to FIG. 11, a flow diagram of an exemplary method for dynamic QOS assignment utilizing encoding, in accordance with an embodiment of the present invention, is illustrated and designated generally by reference numeral 1100. Initially, as indicated at block 1102, a data packet is received, e.g., by mobile node 102 of FIG. 1, as previously discussed with reference to FIG. 9. Next, as indicated at block 1104, the indicator is encoded. For example, the indicator is hashed with another portion of the data packet header, such as checksum 122 of FIG. 1.

Next, as indicated at block 1106, the indicator is embedded into a data packet header, e.g., header 112 of FIG. 1, as previously discussed with reference to FIG. 10. Next, as indicated at block 1108, the data packet is communicated from a source to a destination. The destination retrieves the indicator from the data packet and decodes the bit values of the indicator field to ascertain an indicator. For instance, where the indicator is encoded by hashing the indicator with a checksum, the destination ascertains both the indicator and the checksum from the bits in the indicator field using a reverse-hash. The destination also compares the decoded indicator field to determine whether the bits received from the indicator field correspond with a current indicator. Where the decoded indicator field does correspond with a current indicator, the destination associates either the single data packet, or all data packets in the communications stream, with a set of QOS parameters.

Figure 12:
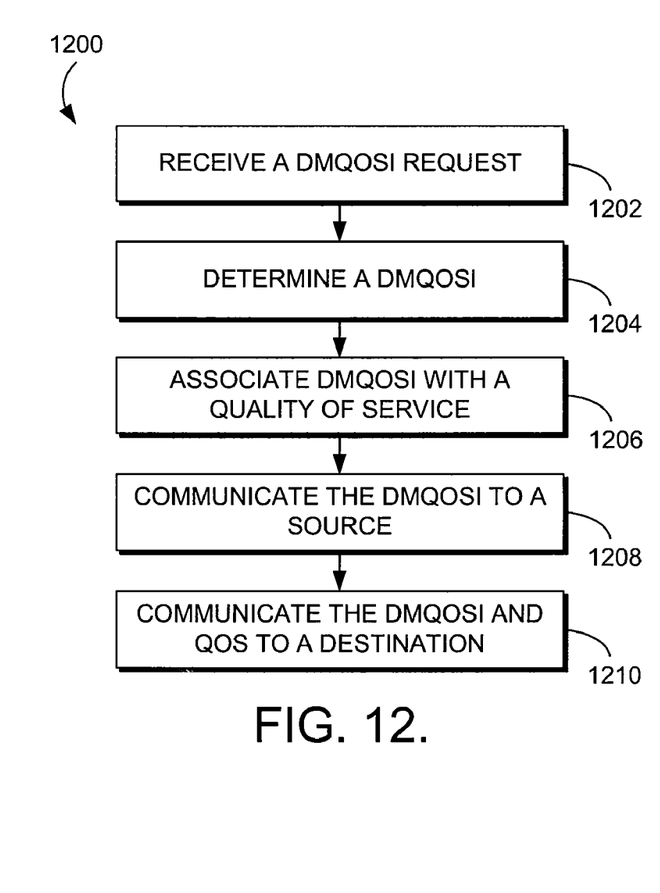
FIG. 12 is a flow diagram illustrating an exemplary method for dynamic quality of service assignment including determining and assigning an indicator, in accordance with an embodiment of the present invention.

Turning now to FIG. 12, a flow diagram of an exemplary method for dynamic QOS assignment utilizing encoding, in accordance with an embodiment of the present invention, is illustrated and designated generally by reference numeral 1200. Initially, as indicated at block 1202, a request for an indicator is received, e.g., a request for indicator 114 of FIG. 1 is received by policy server 106 of FIG. 1. Where a time-based event is utilized, when the time-based event expires, a source and/or a destination requests an updated indicator from the policy server. Where a flow-based expiry is utilized, upon termination of a communications stream and/or initiation of a communications stream, a source and/or a destination requests an updated indicator from the policy server.

Next, as indicated at block 1204, an indicator is determined. For example, the new indicator is determined upon receiving a request for an indicator and the new indicator is different from a previously assigned indicator even though the new indicator is associated with the same QOS as the previously assigned indicator. Next, as indicated at block 1206, the indicator is associated with a QOS. As previously discussed, there are various QOS levels available for communications streams. Upon determining an indicator, the policy server associates the new indicator with one of the QOS levels. For instance, as previously discussed the previously assigned indicator may be "0000" corresponding with QOS level 1 and the new indicator may be "1111" still corresponding with QOS level 1.

Next, as indicated at block 1208, the indicator is communicated to a source, e.g., mobile node 102 of FIG. 1. Further, as indicated at block 1210, the indicator and QOS is communicated to a destination, e.g., IP gateway 104 of FIG. 1. As previously stated, upon receiving a request for an indicator, either upon expiration of a time-based event or a flow-based expiry, the policy server determines a new indicator. The indicator is then communicated to the source and destination so that both the source and destination have a current indicator and can effectively communicate an appropriate QOS to be associated with a data packet or communications stream.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media ("media") having computer-usable instructions embodied thereon for performing a method of communicating data at a prescribed quality of service level (QOS), the method comprising:
   receiving a data packet that is part of a communications stream;
   embedding a dynamically modifiable QOS indicator (DMQOSI) into the data packet, wherein the DMQOSI (i) indicates a prescribed QOS that is associated with the data packet and (ii) is modifiable prior to completing a communication of the communications stream; and
   communicating the data packet from a source to a destination that at least periodically references the DMQOSI to ensure that the communications stream is being communicated consistent with the prescribed QOS associated with the data packet.

2. The media of claim 1, wherein embedding the DMQOSI into the data packet comprises:
   requesting the DMQOSI from a policy server, the policy server determining the DMQOSI and associating the DMQOSI with the quality of service;
   receiving the DMQOSI from the policy server; and
   embedding the DMQOSI into a header of the data packet.

3. The media of claim 2, wherein the policy server communicates the DMQOSI and the quality of service associated with the DMQOSI to the destination.

4. The media of claim 1, wherein embedding the DMQOSI into the data packet comprises:
   encoding the DMQOSI; and
   embedding the DMQOSI into a header of the data packet.

5. The media of claim 4, further comprising the destination decoding the DMQOSI.

6. The media of claim 5, wherein encoding the DMQOSI comprises performing a hash on the DMQOSI and wherein decoding the DMQOSI comprises performing a reverse-hash on the DMQOSI.

7. The media of claim 6, wherein the DMQOSI is modified upon expiration of a time-based event.

8. The media of claim 7, wherein the destination references the DMQOSI at irregular intervals.

9. One or more non-transitory computer-readable media ("media") having computer-usable instructions embodied thereon for performing a method of communicating data at a prescribed quality of service level (QOS), the method comprising:
   receiving a data packet that is part of a communications stream;
   embedding a dynamically modifiable quality of service indicator (DMQOSI) into the data packet that (i) indicates a QOS associated with the data packet and (ii) is modifiable prior to beginning to communicate the communications stream; and
   communicating the data packet from a source to a destination that at least periodically references the DMQOSI to determine the QOS associated with the communications stream.

10. The media of claim 9, wherein embedding the DMQOSI into the data packet comprises:
    encoding the DMQOSI; and
    embedding the DMQOSI into a header of the data packet.

11. The media of claim 10, further comprising the destination decoding the DMQOSI.

12. The media of claim 11, wherein encoding the DMQOSI comprises performing a hash on the DMQOSI and wherein decoding the DMQOSI comprises performing a reverse-hash on the DMQOSI.

13. The media of claim 9, wherein embedding the DMQOSI into the data packet comprises:
    requesting the DMQOSI from a policy server, the policy server
    determining the DMQOSI and associating the DMQOSI with the quality of service;
    receiving the DMQOSI from the policy server; and
    embedding the DMQOSI into a header of the data packet.

14. The media of claim 13, wherein the policy server communicates the DMQOSI and the quality of service associated with the DMQOSI to the destination.

15. The media of claim 14, wherein the destination references the DMQOSI at irregular intervals.

* * * * *